US012136502B2

(12) United States Patent
Uegaki et al.

(10) Patent No.: US 12,136,502 B2
(45) Date of Patent: Nov. 5, 2024

(54) COMMUNICATION CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Ryoma Uegaki, Mie (JP); Kinji Taguchi, Mie (JP); Takaki Endo, Mie (JP); Tatsuya Shimada, Mie (JP); Yuta Yasuyoshi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 86 days.

(21) Appl. No.: 17/801,967

(22) PCT Filed: Feb. 5, 2021

(86) PCT No.: PCT/JP2021/004289
§ 371 (c)(1),
(2) Date: Aug. 24, 2022

(87) PCT Pub. No.: WO2021/171960
PCT Pub. Date: Sep. 2, 2021

(65) Prior Publication Data

US 2023/0098842 A1 Mar. 30, 2023

(30) Foreign Application Priority Data

Feb. 26, 2020 (JP) ................................ 2020-030046

(51) Int. Cl.
*H01B 7/18* (2006.01)
*H01B 3/30* (2006.01)
(Continued)

(52) U.S. Cl.
CPC ................ *H01B 7/18* (2013.01); *H01B 3/30* (2013.01); *H01B 7/02* (2013.01); *H01B 11/002* (2013.01); *H01B 11/02* (2013.01)

(58) Field of Classification Search
CPC ... H01B 3/30; H01B 3/44; H01B 7/02; H01B 7/0216; H01B 7/0291; H01B 7/04;
(Continued)

(56) References Cited

U.S. PATENT DOCUMENTS 5,245,134 A * 9/1993 Vana, Jr. ............. H01B 11/203 385/112
5,283,390 A * 2/1994 Hubis ................. H01B 11/002 174/102 R
(Continued)

FOREIGN PATENT DOCUMENTS

EP 3506323 A1 * 7/2019 ............... H01B 7/29
JP H10-208552 A 8/1998
(Continued)

OTHER PUBLICATIONS

International Search Report issued on Apr. 13, 2021 for WO 2021/171960 A1 (4 pages).

*Primary Examiner* — William H. Mayo, III
(74) *Attorney, Agent, or Firm* — Venjuris, P.C.

(57) ABSTRACT

A communication cable includes a solid sheath on an outer periphery of a signal cable having a plurality of insulated
(Continued)

wires and in which transmission characteristics hardly decrease due to a pressure in extrusion-molding a sheath. The signal cable 10 includes a plurality of insulated wires 11 each having a conductor 12 and an insulation coating 13 covering an outer periphery of the conductor 12, and a solid sheath 20 covering an outer periphery of the signal cable 10. A melt flow rate of a constituent material of the sheath 20 measured at 200° and with a load of 2.16 kg is 0.25 g/10 min. or more.

6 Claims, 2 Drawing Sheets

(51) Int. Cl.
*H01B 7/02* (2006.01)
*H01B 11/00* (2006.01)
*H01B 11/02* (2006.01)

(58) Field of Classification Search
CPC ... H01B 7/06; H01B 7/18; H01B 7/29; H01B 7/34; H01B 9/02; H01B 9/08; H01B 11/02; H01B 11/002; H01B 11/04; H01B 11/06; H01B 11/08; H01B 11/12; H01B 13/02; H01B 13/0036
USPC .......... 174/28, 110 R, 113 R, 117 R, 117 FF; 428/375, 329, 461, 500
See application file for complete search history.

(56) References Cited

U.S. PATENT DOCUMENTS 5,656,371 A * 8/1997 Kawahigashi ......... H01B 3/441 428/375
5,744,757 A * 4/1998 Kenny ................... H01B 3/441 174/34
5,770,820 A * 6/1998 Nelson ................. C08K 5/0066 174/121 A
7,982,132 B2 * 7/2011 Hopkinson ............ H01B 11/06 174/113 R
8,378,217 B2 * 2/2013 Sugiyama ............ H01B 11/203 174/115
10,818,412 B2 * 10/2020 Uegaki ................ H01B 7/0216
11,062,822 B2 * 7/2021 Uegaki .................... H01B 7/18
2005/0241820 A1 11/2005 Wasserman et al.
2008/0227887 A1 9/2008 Klier et al.
2008/0264671 A1 * 10/2008 Kenny ................. H01B 7/1805 174/120 SR
2012/0298400 A1 * 11/2012 Hinoshita ................ H01B 7/29 174/113 R
2018/0114610 A1 4/2018 Uegaki et al.
2019/0027272 A1 1/2019 Uegaki et al.
2020/0118708 A1 4/2020 Uegaki et al.
2020/0251249 A1 8/2020 Uegaki et al.
2021/0005348 A1 1/2021 Uegaki et al.
2021/0398716 A1 * 12/2021 Johansen ............... H01B 11/02

FOREIGN PATENT DOCUMENTS

JP 2013-098127 A 5/2013
JP WO 2017/168842 A1 * 5/2014 ............. H01B 11/02

* cited by examiner

COMMUNICATION CABLE

CROSS REFERENCE TO RELATED APPLICATIONS

This application is a national phase of PCT application No. PCT/JP2021/004289, filed on 5 Feb. 2021, which claims priority from Japanese patent application No. 2020-030046, filed on 26 Feb. 2020, all of which are incorporated herein by reference.

TECHNICAL FIELD

The present disclosure relates to a communication cable.

BACKGROUND

A demand for high-speed communication is on the increase in the field of automobiles and the like. A communication cable including a twisted pair cable obtained by twisting a pair of insulated wires each including a conductor and an insulation coating covering the outer periphery of the conductor, and a sheath made of an insulating material for covering the outer periphery of the twisted pair cable is disclosed in Patent Document 1 and 2. In Patent Document 1 and 2, loose jacket communication cables in which gaps are provided between the sheath and the insulated wires constituting the twisted pair cable are mainly handled.

PRIOR ART DOCUMENT

Patent Document

Patent Document 1: International Publication No. WO 2017/168842

Patent Document 2: International Publication No. WO 2018/117204

SUMMARY OF THE INVENTION

Problems to be Solved

Besides loose jacket communication cables including gaps between a sheath and a signal cable as disclosed in patent literature 1 and 2, solid communication cables in which gaps are substantially not provided between a sheath and a signal cable and a constituent material of the sheath is held in close contact with the surfaces of insulated wires constituting the signal cable are available as communication cables including a sheath on the outer periphery of a signal cable having a plurality of insulated wires. The loose jacket communication cables and the solid communication cables respectively have advantages. A great advantage of the communication cable having a solid sheath is that relative position shifts such as loosening of a twisted structure in the insulated wires constituting the signal cable can be suppressed by pressing the signal cable from outside by the sheath. By stably holding relative positions of the insulated wires constituting the signal cable, a stable characteristic impedance is obtained and communication characteristics such as a mode conversion characteristic are improved in the communication cable.

However, if the sheath has a solid structure, a large pressure is applied to the insulated wires constituting the signal cable by a molten polymer material in forming the sheath by extrusion molding as compared to the loose jacket sheath. Then, relative position shifts and deformation of those insulated wires occur and balancing of the signal cable is possibly reduced. For example, FIG. 2 shows a state where insulation coatings 13, 13 constituting a pair of insulated wires 11, 11 are squeezed at mutually adjacent positions. A reduction in balancing of the signal cable possibly leads to a reduction in transmission characteristics of the communication cable such as a deterioration of a mode conversion characteristic.

In view of the above, it is aimed to provide a communication cable which includes a solid sheath on the outer periphery of a signal cable having a plurality of insulated wires and in which a reduction in transmission characteristics due to a pressure in extrusion-molding the sheath is unlikely to occur.

Means to Solve the Problem

The present disclosure is directed to a communication cable with a signal cable including a plurality of insulated wires each having a conductor and an insulation coating covering an outer periphery of the conductor, and a solid sheath covering an outer periphery of the signal cable, wherein a melt flow rate of a constituent material of the sheath measured at 200° and with a load of 2.16 kg is 0.25 g/10 min. or more.

Effect of the Invention

The communication cable according to the present disclosure is a communication cable which includes a solid sheath on the outer periphery of a signal cable having a plurality of insulated wires and in which a reduction in transmission characteristics due to a pressure in extrusion-molding the sheath is unlikely to occur.

DETAILED DESCRIPTION TO EXECUTE THE INVENTION

Description of Embodiments of Present Disclosure

Figure 1:
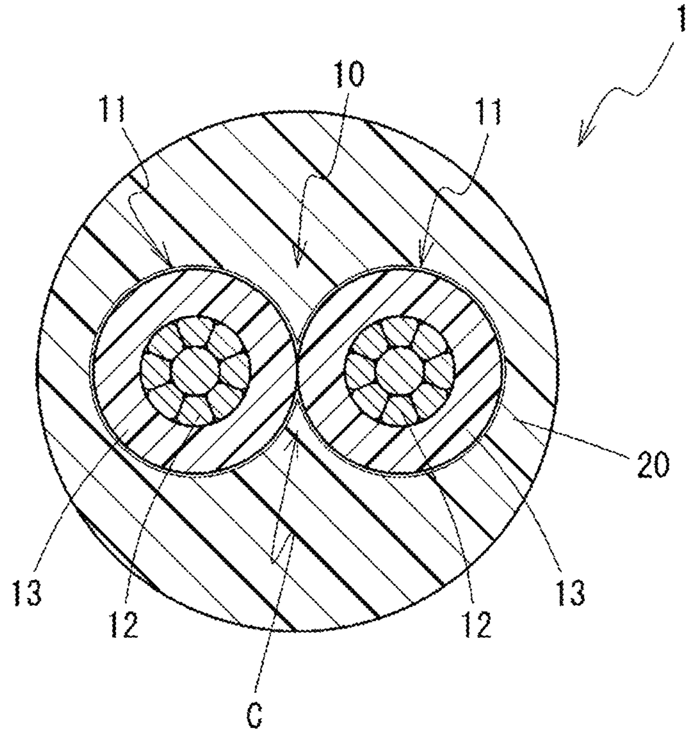
FIG. 1 is a section showing the configuration of a communication cable according to one embodiment of the present disclosure (in FIG. 1 and FIG. 2 next, small gaps are shown even at positions where members are in contact so as to be easily seen).

First, embodiments of the present disclosure are listed and described.

The communication cable according to the present disclosure is provided with a signal cable including a plurality of insulated wires each having a conductor and an insulation coating covering an outer periphery of the conductor, and a solid sheath covering an outer periphery of the signal cable, wherein a melt flow rate of a constituent material of the sheath measured at 200° and with a load of 2.16 kg is 0.25 g/10 min. or more.

In the above communication cable, the sheath has a solid structure, the constituent material of the sheath is held in close contact with the surfaces of the insulated wires constituting the signal cable and has a melt flow rate equal to or higher than a predetermined lower limit. Thus, in forming the sheath by extrusion molding, the constituent material is easily filled in a region around the insulated wires and a pressure to be applied to the insulated wires can be small. As a result, a situation where relative position changes and deformation of the insulated wires occur and balancing of the signal cable is reduced due to the pressure at the time of extrusion molding is unlikely to occur. As a result, transmission characteristics including a mode conversion characteristic are maintained in a high state in the communication cable.

Here, the signal cable may be configured as a twisted pair cable by twisting a pair of the insulated wires with each other. By configuring the signal cable as the twisted pair cable, relative positions of the pair of insulated wires are easily stably held as compared to the case where the pair of insulated wires are arranged in parallel without being twisted with each other. Thus, together with an effect of enhancing the melt flow rate of the constituent material of the sheath, relative position changes of the insulated wires are particularly unlikely to occur in manufacturing the sheath by extrusion molding. As a result, the transmission characteristics of the communication cable are particularly satisfactorily maintained.

Another laminar member may not be provided between the sheath and the signal cable. If a member such as a tape is arranged on the outer periphery of the signal cable, the relative positions of the insulated wires constituting the signal cable are easily stably maintained. However, since the melt flow rate of the constituent material of the sheath is sufficiently high in the communication cable according to the present disclosure, the relative positions of the insulated wires can be sufficiently stably held even if a member such as a tape is not arranged on the outer periphery of the signal cable. By not arranging the member such as a tape on the outer periphery of the signal cable, the manufacturing cost of the communication cable can be suppressed.

If a thickness of the insulation coating in a thinnest part of the insulated wire is a short thickness and a thickness of the insulated wire in a direction orthogonal to a direction of the short thickness is a long thickness, a coating thickness ratio specified as a ratio of the short thickness to the long thickness may be 65% or more. It is indicated that the relative position changes and deformation of the insulated wires constituting the signal cable are smaller as the coating thickness ratio increases, and the coating thickness ratio serves as a good index to obtain high transmission characteristics. If the coating thickness ratio is 65% or more, the communication cable can obtain a sufficiently high mode conversion characteristic.

In this case, the coating thickness ratio may be 95% or less. As the coating thickness ratio increases, good transmission characteristics including the mode conversion characteristic are obtained in the communication cable. Even if the coating thickness ratio is increased beyond 95%, an effect of improving the transmission characteristics is saturated. As the melt flow rate of the material constituting the sheath increases, the coating thickness ratio tends to become larger. However, by not excessively increasing the coating thickness ratio, various materials can be used as the constituent material of the sheath. Further, the manufacturing cost of the communication cable can be suppressed.

Details of Embodiment of Present Disclosure

Hereinafter, a communication cable according to one embodiment of the present disclosure is described in detail using figures. In this specification, a melt flow rate (MFR) indicates a value measured at 200° C. and with a load of 2.16 kg. Other characteristics are values measured at a room temperature in the atmosphere unless otherwise noted. Further, in this specification, that a certain component is a main component in a material composition indicates a state where that component occupies 50% by mass or more in the total mass of the material. Organic polymers include those having a relatively low polymerization degree such as oligomers. Terms indicating the shapes and arrangement of members such as parallel, perpendicular, orthogonal and circular do not mean geometrically strict concepts, but also include errors in ranges allowable as the communication cable.

(Overall Configuration of Communication Cable)

FIG. 1 is a section cut perpendicular to an axial direction of a communication cable 1 according to the one embodiment of the present disclosure.

The communication cable 1 includes a signal cable 10. The signal cable 10 includes a plurality of insulated wires 11. The communication cable 1 further includes a sheath 20 covering the outer periphery of the signal cable 10. In this embodiment, the sheath 20 has a solid structure. A constituent material of the sheath 20 is described in detail later, but has an MFR of 0.25 g/10 min. or more.

Each insulated wire 11 constituting the signal cable 10 includes a conductor 12 and an insulation coating 13 covering the outer periphery of the conductor 12. The number of the insulated wires 11 constituting the signal cable 10 is not particularly limited and can be two, four or the like. Here, the signal cable 10 including two (a pair of) insulated wires 11, 11 is handled. The communication cable 1 including the pair of insulated wires 11, 11 as the signal cable 10 can be used to transmit a differential signal. The signal cable 10 may be configured as a parallel pair cable in which the pair of insulated wires 11, 11 are arranged in parallel and in contact with each other with axial directions thereof aligned in parallel, but is preferably configured as a twisted pair cable in which the pair of insulated wires 11, 11 are twisted with each other. The twisted pair cable has a better effect of stably holding relative positions of the pair of insulated wires 11, 11 than the parallel pair cable. A case where the signal cable 10 is configured as a twisted pair cable is also mainly handled below. An applicable frequency of the communication cable 1 is not particularly limited, but the communication cable 1 may be usable at least in a frequency range of 1 MHz to 50 MHz.

Various metal materials can be used as a material constituting the conductor 12, but copper alloy is preferably used in terms of enhancing the transmission characteristics in the signal cable 10 while maintaining strength. The conductor 12 may be constituted by a single wire, but is preferably constituted by a stranded wire obtained by stranding a plurality of (e.g. seven) strands. In this case, compression molding may be performed after the strands are stranded, thereby obtaining a compressed stranded wire. When the conductor 12 is constituted as a stranded wire, the conductor may be composed of all the same strands or may be composed of two or more types of strands.

A material constituting the insulation coating 13 is also not particularly limited, but a material containing an organic polymer as a main component is preferably used. Examples of the organic polymer include polyolefins such as polyethylene and polypropylene, polyvinyl chloride, polystyrene, polytetrafluoroethylene, and polyphenylene sulfide. Particularly, the use of an organic polymer having a low molecular polarity, particularly no polarity, is preferable. Among the above, the use of polyolefin, particularly polypropylene, is preferable. A plurality of kinds of those listed above may be mixed and used as the organic polymer and some of those listed above and some other than those listed above may be mixed and used. The polymer material constituting the insulation coating 13 may be cross-linked or foamed. Further, in addition to the organic polymer, additives may be appropriately contained in the material of the insulation coating 13. Examples of the additives include various additives which can be generally added to coating materials of wires such as flame retardants, stabilizers, fillers, anti-aging agents, pigments and lubricants.

A diameter of the conductor 12 and a thickness of the insulation coating 13 are not particularly limited, but a conductor cross-sectional area is preferably set to less than 0.22 $mm^2$, particularly set to 0.15 $mm^2$ or less in terms of thinning and the like of the insulated wire 11. Further, the thickness of the insulation coating 13 is preferably set to 0.30 mm or less, particularly 0.20 mm or less. If such conductor cross-sectional area and coating thickness are adopted, an outer diameter of the insulated wire 11 can be set to 1.0 mm or less and further 0.90 mm or less. Further, if such conductor cross-sectional area and coating thickness are adopted, characteristic impedance of the communication cable 1 is easily confined, for example, within a range of 100±10Ω. A twist pitch of the twisted pair cable constituted by the pair of insulated wires 11, 11 can be illustrated to be 12 mm or more and 30 mm or less.

The sheath 20 functions to protect the signal cable 10 and stabilize relative positions of the insulated wires 11, 11 in the signal cable 10 in the communication cable 1. As described above, the sheath 20 has the solid structure. That is, gaps are not provided, except unavoidable ones, between the sheath 20 and the insulated wires 11, 11 constituting the signal cable 10, and the constituent material of the sheath 20 is held in close contact with the substantially entire regions of the surfaces of the insulated wires 11, 11 of the entire signal cable 10 exposed to outside. Note that gaps unavoidably formed between the sheath 20 and the insulated wires 11, 11 constituting the signal cable 10 indicate those having a porosity of approximately less than 5%. Here, the porosity indicates a ratio of an area occupied by the gaps, out of an area of a region surrounded by the outer peripheral surface of the sheath 20 in a cross-section perpendicular to the axial direction of the communication cable 1.

The constituent material of the sheath 20 contains an organic polymer as a main component and is not particularly limited as long as having a MFR of 0.25 g/10 min. Examples of this constituent material include materials containing organic polymers including polyolefins such as polyethylene and polypropylene, polyvinyl chloride, polystyrene, polytetrafluoroethylene, and polyphenylene sulfide. Among these, the use of polyolefin, particularly polypropylene, is preferable. A plurality of kinds of those listed above may be mixed and used or some of those listed above and some other than those listed above may be mixed and used as the organic polymer. The polymer material constituting the sheath 20 may be cross-linked or foamed. Further, in addition to the organic polymer, additives may be appropriately contained in the material of the sheath 20. Examples of the additives include various additives which can be generally added to coating materials of wires such as flame retardants, stabilizers, fillers, anti-aging agents, pigments and lubricants. The constituent material of the sheath 20 may be of the same kind as or different in kind from the constituent material of the insulation coating 13. In terms of simplifying the configuration of the entire communication cable 1 and a manufacturing process, the sheath 20 is preferably made of the same kind of material.

A thickness of the sheath 20 may be appropriately set to sufficiently obtain an effect of protecting the signal cable 10 and holding the relative positions of the insulated wires 11, 11 in the signal cable 10 and obtain a desired characteristic impedance. The thickness in a thinnest part may be set to 0.2 mm or more, preferably 0.3 mm or more. On the other hand, in view of suppressing an effective dielectric constant, ensuring characteristic impedance in a predetermined range and thinning the entire communication cable 1, the thickness of the sheath 20 in the thinnest part may be 1.0 mm or less, preferably 0.8 mm or less. Further, an outer diameter of the entire communication cable 1 specified by the outer peripheral surface of the sheath 20 may be set to 4.0 mm or less and further 3.5 mm or less.

In the communication cable 1, the provision of another laminar member between the sheath 20 and the signal cable 10 is not denied, but such a laminar member is preferably not provided. Here, the laminar member indicates a member made of a laminar and continuous solid material containing an organic polymer as a main component and surrounding the outer periphery of the signal cable 10 and a tape body and the like spirally wound on the outer periphery of the signal cable 10 can be illustrated as such. Note that a substance other than the laminar member may be interposed between the sheath 20 and the signal cable 10. For example, a configuration in which the sheath 20 is provided after a peeling agent containing an inorganic powder material such as talc is arranged on the outer periphery of the signal cable 10 can be illustrated as a preferable one.

(Constituent Material of Sheath and Transmission Characteristics)

In the communication cable 1 according to this embodiment, the signal cable 10 can be pressed from outside and the structure of the signal cable 10 can be stably held since the sheath 20 has the solid structure. As a result, in the communication cable 1, a predetermined characteristic impedance can be stably obtained and transmission characteristics such as a mode conversion characteristic can also be enhanced. Particularly, if the signal cable 10 is configured as a twisted pair cable by twisting the pair of insulated wires 11, 11 with each other, a high effect of stabilizing the characteristic impedance and improving the transmission characteristics is obtained together with an effect of stabilizing the mutual arrangement of the insulated wires 11, 11 by that twisted structure. In this case, the solid sheath 20 functions to hold the twisted structure of the twisted pair cable without loosening.

In the communication cable 1 according to this embodiment, the material constituting the solid sheath 20 contains the organic polymer as a main component and indicates a MFR of 0.25 g/10 min. at 200° C. and with a load of 2.16 kg. The sheath 20 is formed by extrusion-molding the molten polymer material on the outer periphery of the signal cable 10. Generally, besides solid sheaths having substantially no gap between the sheath and a signal cable, loose jacket sheaths provided with gaps between the sheath and a signal cable are available as sheaths provided in communication cables including a plurality of insulated wires. In the case of forming the solid sheath 20, out of those, the molten constituent material of the sheath 20 needs to be held in close contact with the insulation coatings 13 constituting the signal cable 10. Thus, a large pressure is applied to the insulated wires 11, 11 from the molten constituent material of the sheath 20 as compared to a loose jacket sheath.

If a large pressure is applied to the insulated wires 11, 11 by the molten polymer material, there are a possibility of relative position shifts of the pair of insulated wires 11, 11 and a possibility of deformation of the insulated wires 11, 11. Typically, as in a communication cable 1' shown in FIG. 2, insulation coatings 13 are easily squeezed in a central part C where a pair of insulated wires 11, 11 are adjacent to each other. If relative position shifts or deformation of the insulated wires 11, 11 constituting the signal cable 10 occur, balancing of the signal cable 10 is reduced. A reduction in balancing possibly leads to a reduction in the transmission characteristics of the communication cable 1 such as a deterioration of the mode conversion characteristic.

However, in the communication cable 1 according to this embodiment, since the constituent material of the sheath 20 has a MFR of 0.25 g/10 min. or more and is excellent in liquidity, the molten polymer material is easily filled in a region around the insulated wires 11, 11 constituting the signal cable 10 until being held in close contact with the surfaces of the insulated wires 11, 11 when extrusion molding is performed even if a high pressure is not applied. Thus, a large pressure is hardly applied to the insulated wires 11, 11 from the molten polymer material and the relative position shifts and deformation of the insulated wires 11, 11 are less likely to occur at the time of extrusion molding of the sheath 20. As shown in FIG. 1, the insulation coatings 13 are hardly squeezed also in a central part C where the pair of insulated wires 11, 11 are adjacent to each other, and the respective insulated wires 11, 11 are easily held in a highly symmetrical shape.

By suppressing the relative position shifts and deformation of the insulated wires 11, 11, balancing of the signal cable 10 can be held high and the transmission characteristics of the communication cable 1 such as the mode conversion characteristic can be maintained high. Particularly, if the signal cable 10 is configured as a twisted pair cable, the relative arrangement of the pair of insulated wires 11, 11 is easily maintained and an effect of suppressing a reduction in balancing of the signal cable 10 is excellent due to the twisted structure of the insulated wires 11, 11 also when the sheath 20 is extrusion-molded. For example, if the signal cable 10 is a twisted pair cable, a longitudinal conversion transfer loss (LCTL) at a communication frequency of 1 MHz to 50 MHz can be set to −50 dB or less (LCTL≤−50 dB) and further −55 dB or less (LCTL≤−55 dB).

In terms of more effectively suppressing the influence of pressure application during the extrusion molding of the sheath 20 on the transmission characteristics, the MFR of the constituent material is particularly preferably 0.3 g/10 min. or more and further 0.5 g/10 min. or more and 0.8 g/10 min. or more. On the other hand, an upper limit is not particularly provided for the MFR of the constituent material of the sheath 20, but the MFR is better to be approximately 7.0 g/10 min. or less and further 5.0 g/10 min. or less since the manufacturability of the sheath 20 by extrusion molding is reduced if the MFR is too high. The MFR of the constituent material of the sheath 20 can be adjusted by the kind (kind of a monomer unit and repeat pattern) and polymerization degree of the organic polymer used, the kinds and amounts of the additives and the like. The MFR may be adjusted by mixing a plurality of organic polymers having different polymerization degrees.

As described above, since the constituent material of the sheath 20 has the MFR of 0.25 g/10 min., position shifts and deformation of the insulated wires 11, 11 when the sheath 20 is extrusion-molded can be sufficiently suppressed. Thus, another laminar member such as a tape body needs not be arranged between the sheath 20 and the signal cable 10 for the purpose of suppressing position shifts and deformation. By arranging no other laminar member, the number of members constituting the communication cable 1 is reduced and the manufacturing process of the communication cable 1 is also simplified, wherefore the manufacturing cost of the communication cable 1 can be suppressed low.

Figure 2:
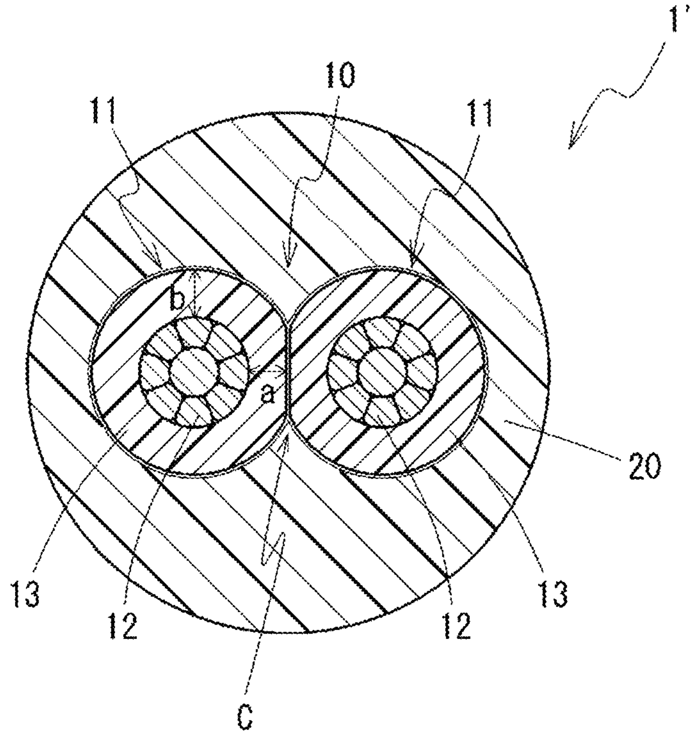
FIG. 2 is a section showing the communication cable with largely deformed insulation coatings.

A degree of deformation of the communication cable 1 in extrusion-molding the sheath 20 can be evaluated by a coating thickness ratio R. As shown in FIG. 2, it is assumed that a thickness in a part where the insulation coating 13 is thinnest is a short thickness a and a thickness of the insulation coating 13 in a direction orthogonal to a direction corresponding to the short thickness a is a long thickness b in a cross-section orthogonal to the axial direction of the communication cable 1. A ratio of the short thickness a to the long thickness b is set as the coating thickness ratio R ($R=a/b\times100\%$). As a value of the coating thickness ratio R increases, a difference between the short thickness a and the long thickness b becomes smaller and cross-sections of the insulated wires 11, 11 have a higher symmetry, i.e. have a nearly circular shape and indicate that the insulated wires 11, 11 are not largely deformed during the extrusion molding of the sheath 20. As also described above, in the signal cable 10, the insulation coatings 13 are easily squeezed in the central part C where the pair of insulated wires 11, 11 are adjacent to each other, and the thickness of the insulation coating 13 in the part where the pair of insulated wires 11, 11 are adjacent to each other is the short thickness a. On the other hand, the long thickness b is specified in a direction (vertical direction of FIG. 2) rotated 90° from an adjacent direction of the insulated wires 11, 11, which is the direction of the short thickness a. The thickness of the insulation coating 13 in the direction of the long thickness b and an outward direction (outward lateral direction of FIG. 2) of the arrangement of the insulated wires 11, 11 further rotated 90° is maintained at a thickness substantially unchanged from the one before the extrusion molding of the sheath 20.

In the communication cable 1 according to this embodiment, the MFR of the sheath 20 is sufficiently high. Thus, the coating thickness ratio R of the insulated wires 11, 11 is maintained at a large value even after the extrusion molding of the sheath 20. For example, the coating thickness ratio R can be set to 65% or more and further 70% or more and 80% or more. Since the insulated wires 11, 11 have such a high coating thickness ratio R, an effect of holding high transmission characteristics of the communication cable 1 is particularly excellent. Although an upper limit is not particularly specified for the coating thickness ratio R, the effect of improving the transmission characteristics is saturated if the upper limit is too large. Further, if the coating thickness ratio R is limited to an excessively large range, a material possibly used to form the sheath 20 is limited and cost required for the manufacturing of the communication cable 1 such as the extrusion molding of the sheath 20 also increases. Accordingly, the coating thickness ratio R is preferably set to 95% or less and further 90% or less.

Examples

Examples are described below. Note that the present invention is not limited to these examples. A relationship of the MFR of the constituent material of the sheath and the structure and the transmission characteristics of the communication cable was verified below.

[Fabrication of Samples]

A wire conductor having a conductor cross-sectional area of 0.13 $mm^2$ was fabricated by stranding seven copper alloy strands having a wire diameter $\phi$ of 0.165 mm. A polypropylene resin was extruded on the outer periphery of the obtained wire conductor to form an insulation coating having a thickness of 0.19 mm. An outer diameter of the insulated wire was 0.84 mm. Two insulated wires obtained in this way were twisted at a pitch of 20 mm to fabricate a signal cable.

The polypropylene resin was extruded on the outer periphery of the signal cable fabricated above to form a solid sheath and fabricate a communication cable. An outer diameter of the entire communication cable was set to 3.2 mm and a thickness of the sheath was about 0.74 mm in a thinnest part. Using polypropylene resins having MFRs (values at 200° C. and with a load of 2.16 kg) shown in Table 1 below were respectively used in forming the sheaths to fabricate communication cables according to Samples 1 to 7. The MFR was controlled by combining polypropylene resins having different molecular weights.

[Evaluation]

(Coating Thickness Ratio)

After being embedded and fixed in an acrylic resin, the fabricated communication cables according to Samples 1 to 7 were cut to obtain cross-sectional samples. In the cross-sectional sample, a thickness of the insulation coating in a part where the pair of insulated wires were adjacent to each other as shown in FIG. 2 was measured and set as a short thickness a. Further, a thickness of the insulation coating was measured in a direction orthogonal to the short thickness direction and set as the long thickness b. A ratio of the short thickness a to the obtained long thickness b was calculated and set as the coating thickness ratio R (R=a/b× 100%). Evaluation was made for four individual samples (N=4) and values of the two insulated wires included in the respective sample individuals were averaged by the total number of the individuals and that average value was recorded.

(Transmission Characteristics)

A longitudinal conversion transfer loss (LCTL) was measured as a transmission characteristic for the communication cables according to Samples 1 to 7. Measurements were conducted in a frequency range of 1 MHz to 50 MHz using a network analyzer, and maximum values in that frequency range were recorded.

[Results]

Figure 3:
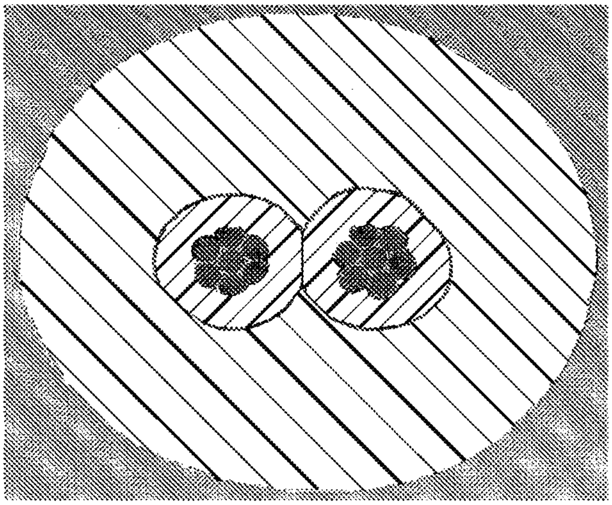
FIG. 3 is a picture obtained by photographing a cross-section of a communication cable according to Sample 3 in an example.

Table 1 shows evaluation results of the coating thickness ratio and the LCTL together with the MFR of the constituent material of the sheath for Samples 1 to 7. Further, FIG. 3 shows a picture obtained by photographing a cross-section of Sample 3.

TABLE 1

| Sample No. | MFR of Sheath [g/10 min.] | Coating Thickness Ratio [%] | LCTL [dB] |
|---|---|---|---|
| 1 | 1.4 | 90 | −54 |
| 2 | 0.8 | 85 | −55 |
| 3 | 0.7 | 86 | −56 |
| 4 | 0.5 | 77 | −55 |
| 5 | 0.3 | 70 | −50 |
| 6 | 0.2 | 63 | −47 |
| 7 | 0.12 | 58 | −44 |

In Samples 1 to 5, the MFR of the constituent material of the sheath is 0.25 g/10 min. or more. Correspondingly, the coating thickness ratio in the insulated wires constituting the communication cable has a large value of 65% or more and it is understood that the deformation of the insulated wires is suppressed small. Also in the cross-section picture of Sample 3 in FIG. 3, it is confirmed that the two insulated wires maintain a highly symmetrical outer shape which can be approximated to a substantially circular shape. Further, in Samples 1 to 5, as the MFR of the constituent material of the sheath increases, the value of the coating thickness ratio increases. On the other hand, in Samples 6, 7 in which the MFR of the constituent material of the sheath is lower than 0.25 g/10 min., the coating thickness ratio is a value smaller than 65% and it is understood that the insulated wires are largely deformed.

Next, looking at LCTL measurement results, the LCTL is −50 dB or less (LCTL≤−50 dB) in Samples 1 to 5 in which the MFR of the constituent material of the sheath is 0.25 g/10 min. or more. Further, it is basically seen that the LCTL decreases as the MFR of the constituent material of the sheath increases. On the other hand, in Samples 6, 7 in which the MFR of the constituent material of the sheath is less than 0.25 g/10 min., the LCTL exceeds −50 dB (LCTL>−50 dB).

From the above experiment results, the deformation of the insulated wires can be suppressed at the time of extrusion molding into a solid shape by using the material having a high MFR as the constituent material of the sheath and increasing liquidity in a molten state. By suppressing the deformation of the insulated wires, the transmission characteristics of the communication cable represented by the mode conversion characteristic can be enhanced. Specifically, by setting the MFR of the constituent material of the sheath to 0.25 g/10 min. or more, the LCTL of the communication cable can be maintained at a level equal to or below −50 dB.

Although the embodiment of the present disclosure has been described in detail above, the present invention is not limited to the above embodiment at all and various changes can be made without departing from the gist of the present invention.

LIST OF REFERENCE NUMERALS

1, 1' communication cable
10 signal cable
11 insulated wire
12 conductor
13 insulation coating
20 sheath
a short thickness
b long thickness
C central part

What is claimed is:

1. A communication cable, comprising:

a signal cable configured as a twisted pair cable by twisting a pair of insulated wires with each other, each insulated wire having a conductor and an insulation coating covering an outer periphery of the conductor; and a solid sheath covering an outer periphery of the signal cable, wherein:

a constituent material of the sheath contains a polypropylene and a melt flow rate of the constituent material of the sheath measured at 200° C. and with a load of 2.16 kg is 0.25 g/10 min. or more, when a thickness of the insulation coating in a thinnest part of the insulated wire is a short thickness and a thickness of the insulated wire in a direction orthogonal to a direction of the short thickness is a long thickness, a coating thickness ratio specified as a ratio of the short thickness to the long thickness is 65% or more and 95% or less, and the short thickness is the thickness of the insulation coating in a part where the pair of insulated wires are in contact with each other in a central part of the signal cable.

2. The communication cable of claim 1, wherein another laminar member is not provided between the sheath and the signal cable.

3. The communication cable of claim 1, wherein the melt flow rate of the constituent material of the sheath is controlled by combining a plurality of polypropylene resins having different molecular weights.

4. The communication cable of claim 1, wherein a porosity of gaps between the sheath and the signal cable indicates a ratio of an area occupied by the gaps, out of an area of a region surrounded by an outer peripheral surface of the sheath in a cross-section perpendicular to an axial direction of the communication cable, and the porosity of the gaps is less than 5%.

5. The communication cable of claim 1, wherein a thickness of the sheath in a thinnest part is 0.2 mm to 1.0 mm.

6. The communication cable of claim 1, wherein an outer diameter of the entire communication cable specified by an outer peripheral surface of the sheath is 4.0 mm or less.

* * * * *